(12) United States Patent
Frank et al.

(10) Patent No.: US 7,375,558 B2
(45) Date of Patent: May 20, 2008

(54) METHOD AND APPARATUS FOR PRE-CLOCKING

(75) Inventors: Ingolf Frank, Oberding (DE); Duncan McRae, Parramatta (AU)

(73) Assignee: Integrated Device Technology, Inc., San Jose, CA (US)

( * ) Notice: Subject to any disclaimer, the term of this patent is extended or adjusted under 35 U.S.C. 154(b) by 0 days.

(21) Appl. No.: 11/314,683

(22) Filed: Dec. 21, 2005

(65) Prior Publication Data

US 2007/0139091 A1  Jun. 21, 2007

(51) Int. Cl.
*G01R 25/00* (2006.01)

(52) U.S. Cl. .............................. 327/5; 327/8; 327/149; 327/153; 327/158; 327/161; 375/373

(58) Field of Classification Search ........ 327/291–295, 327/149, 153, 158, 161, 3, 5, 7–9, 23–24; 331/17, 25, DIG. 2; 375/373–375
See application file for complete search history.

(56) References Cited

U.S. PATENT DOCUMENTS

| | | | |
|---|---|---|---|
| 6,249,188 B1 * | 6/2001 | Kaneko | 331/17 |
| 6,819,153 B2 * | 11/2004 | Sonobe | 327/158 |
| 7,161,391 B2 * | 1/2007 | Lin | 327/3 |
| 7,259,599 B2 * | 8/2007 | Kunitani et al. | 327/141 |

* cited by examiner

*Primary Examiner*—N. Drew Richards
*Assistant Examiner*—William Hernandez
(74) *Attorney, Agent, or Firm*—Heimlich Law; Alan Heimlich, Esq.

(57) ABSTRACT

A method and apparatus for pre-clocking have been disclosed.

5 Claims, 8 Drawing Sheets

METHOD AND APPARATUS FOR PRE-CLOCKING

FIELD OF THE INVENTION

The present invention pertains to clocking. More particularly, the present invention relates to a method and apparatus for pre-clocking.

BACKGROUND OF THE INVENTION

In many applications in electronics there is a limit to how fast an output may be slewed based on signal integrity and other constraints (such as, but not limited to, drive capability, capacitive load, overshoot, ringing, etc.). For example, in Registered Dual Inline Memory Modules (RDIMMs) if the output is slewed too fast, signal integrity suffers. This may present a problem.

Often the output (or output transition) of an electronic device is directly related to how fast a register can change state. This register state change is propagated and eventually results in an output (or output transition).

For example, the time required (delay) to propagate a signal from a register clock edge to the output of the register is the sum of the internal register delay and the register output swing delay. This time (delay) may be too long for fast devices (such as, but not limited to next generation RDIMMs, such as DDR2-667 and DDR2-800). This may present a problem.

BRIEF DESCRIPTION OF THE DRAWINGS

The invention is illustrated by way of example and not limitation in the figures of the accompanying drawings in which.

DETAILED DESCRIPTION

The invention, as exemplified in various embodiments, illustrates pre-clocking. In one embodiment of the invention, pre-clocking is used to effectively decrease the delay to output timing with respect to a clock. In one embodiment of the invention, pre-clocking is used to allow an output signal more time to reach a given output level. That is, one embodiment of the invention allows the use of slower rise and fall times which may result in better signal integrity in an application, reduce current drain, lower electronic emissions, etc.

Figure 3:
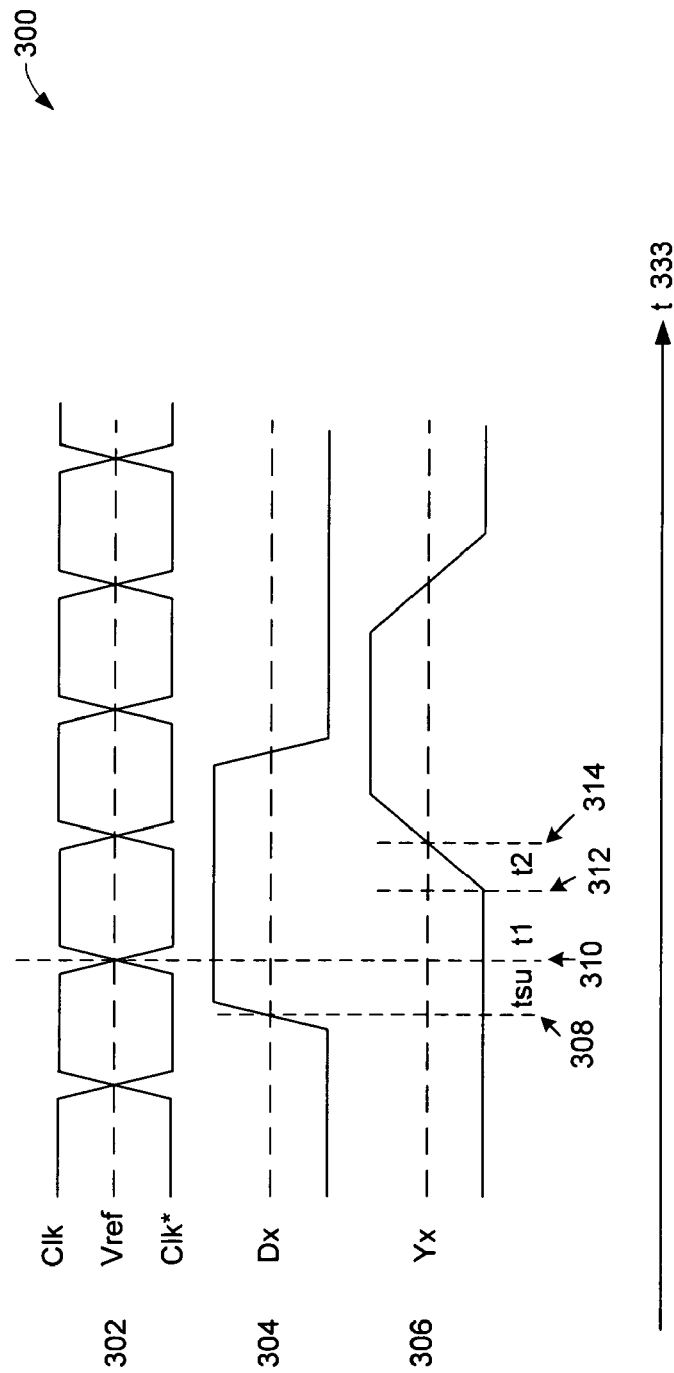
FIG. 3 illustrates a timing diagram for a clock and a switching output used to illustrate embodiments of the invention.

FIG. 3 illustrates at 300 a timing diagram for a clock and a switching output which will be used to illustrate embodiments of the invention. The clock is illustrated at 302 where the clock being high is denoted by Clk, the clock being low is denoted by Clk*, and Vref indicates a reference voltage at or near a midpoint of the clock swing. 304 denotes an input Dx, for example, to a register. 306 denotes an output Yx, for example, from a register. At 333 is a timeline represented by t. At 308, 310, 312, and 314 are time indicators represented by vertical dashed lines in timing diagram 300. tsu represents a setup time (308 to 310), for example, for a register. t1 represents a delay (310 to 312), for example, for a register. t2 represents a delay (312 to 314), for example, for a register output to change. t1+t2 (from 310 to 314) may be considered the register propagation delay.

In one embodiment of the invention, t1 may be a technology dependent internal delay, for example, due to silicon processing, etc. In one embodiment of the invention, t2 may be an application dependent state change delay, for example, due to a maximum slew rate allowed.

As illustrated in FIG. 3, a register output, such as Yx 306, does not start to change until input Dx 304 is clocked into the register by clock 302 at time 310. tsu (308 to 310) is the register setup time.

Figure 4:
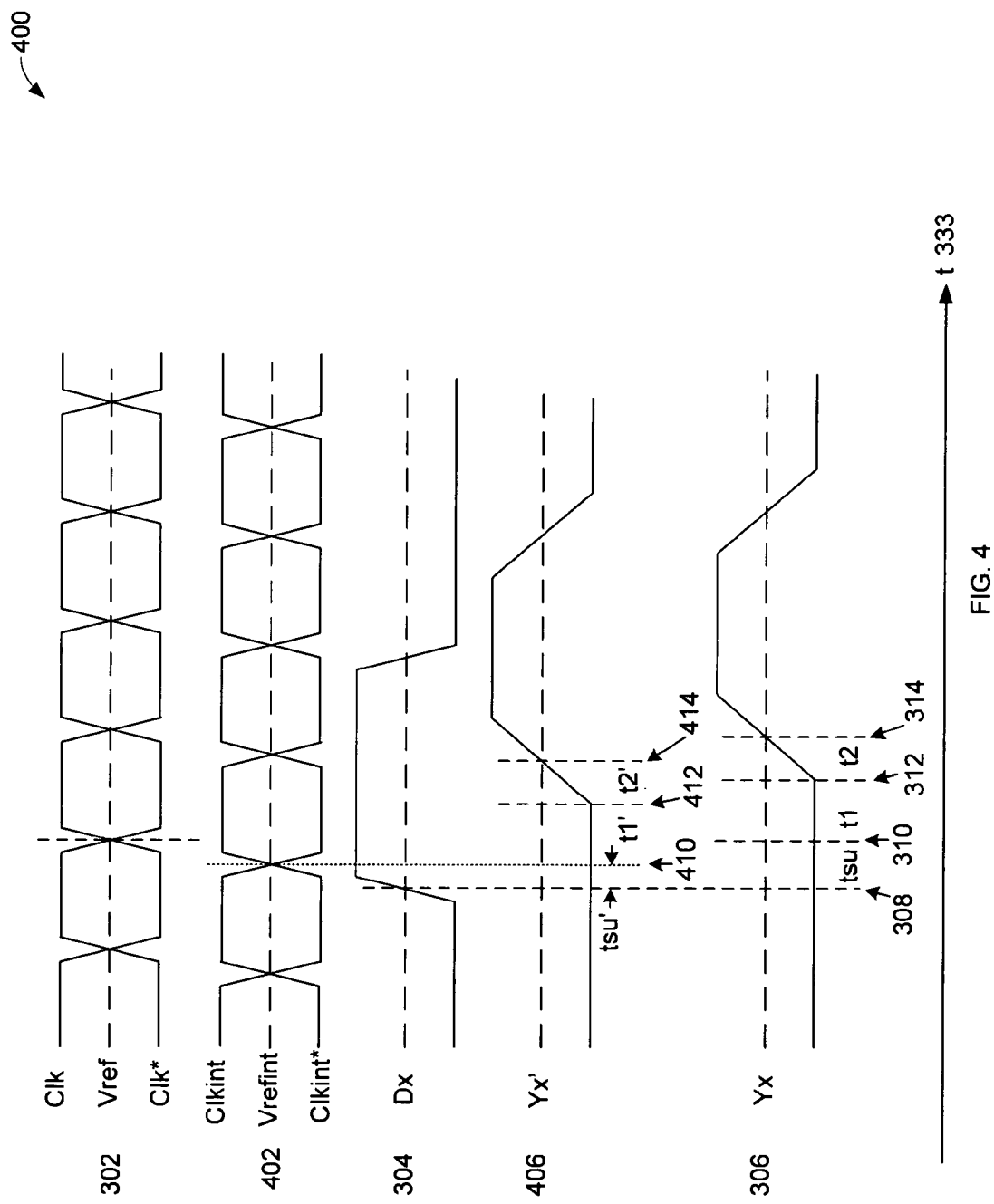
FIG. 4 illustrates a timing diagram for a clock and a switching output for one embodiment of the invention.

FIG. 4 illustrates at 400 a timing diagram for a clock and a switching output for one embodiment of the invention. The clock is illustrated at 302 as described for FIG. 3. 306 denotes an output Yx, for example, from a register using the clock at 302. Timeline 333, and time indicators 308, 310, 312, and 314 are as described for FIG. 3. In this embodiment of the invention an internal clock 402, denoted as logic high by Clkint, logic low by Clkint*, and reference voltage Vrefint, is generated based on the clock 302, however, it is shifted in time with respect to clock 302. For example, in FIG. 4, clock 402 precedes clock 302 by the time difference from 410 to 310. Based on this shift, clock 402 may be used internally to pre-clock (relative to an external clock, such as 302) a register, at, for example, time 410. The setup time for such a register is now tsu' the time from 308 to 410. t1' represents a delay (410 to 412), for example, for a register. t2' represents a delay (412 to 414), for example, for a register output to change. t1'+t2' (410 to 414) may be considered the register propagation delay.

For the sake of illustration, if we assume that t1=t1', and that t2=t2', then as shown in FIG. 4 the output Yx' 406 of a register using clock 402 will precede the output Yx 306 of a register using clock 302 by an amount equal to 414 to 314. This 414 to 314 time (for the t1=t1', t2=t2' case) delay is the same as the 402 clock preceding the 302 clock by the time amount 410 to 310.

Thus, what has been described is a technique of using a pre-clock. One of skill in the art will appreciate that by obtaining the output of a register earlier, a system may be able to operate at a faster speed and/or operate with more timing margin.

Generation of the pre-clock may be done by a variety of techniques. For example, a PLL, a DLL, delay lines, etc.

Figure 5:
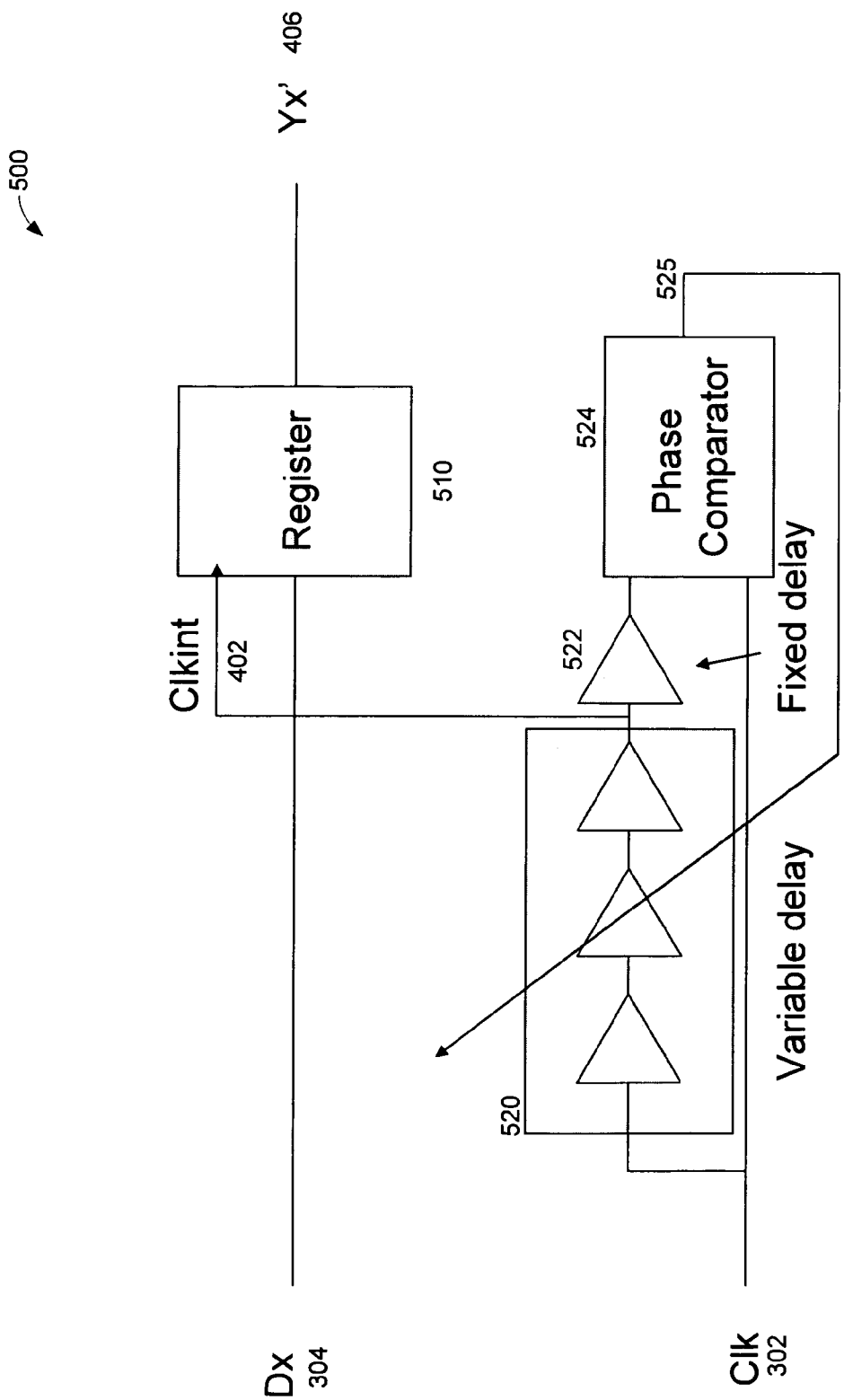
FIG. 5 illustrates one embodiment of the invention.

FIG. 5 illustrates one embodiment of the invention 500. Here a register 510 has a data input Dx 304 a clock input Clkint 402 and an output Yx' 406. The external clock Clk 302 goes into a variable delay block 520 and a phase comparator 524. The output of the variable delay 520 is the register 510 clock Clkint 402. The output of the variable delay 520 also goes into a fixed delay 522. The output of fixed delay 522 goes into the other input of phase comparator 524. The output 525 of phase comparator 524 is used to adjust variable delay 520.

One of skill in the art will appreciate that the variable delay may be used to adjust clock relationships, such as the time 410 to 310 as shown in FIG. 4. For ease of discussion the time from 410 to 310 as shown in FIG. 4 will be referred to as the internal clock shift time. Note that as shown in FIG. 4, 410 is in advance of 310 and may be considered a "pre-clock" relative to the clock 302. If 410 is the same time as 310 then the clock timing is the same (and they are in phase) and the clocking is neither pre nor post clock. If 410 occurs after 310, then it may be considered a "post-clock" relative to clock 302. While the description of the techniques of the invention, such as that shown in FIG. 4 have shown "pre-clocking", the invention is not so limited and the full range from "pre-clocking" to "post-clocking" may be practiced.

In one embodiment of the invention the register setup time tsu may be known in advance and to speed the output of, for example, a register, the internal clock shift time may be fixed to pre-clock the register. In one embodiment of the invention, a controller, either at a low chip level, or at a higher system level, to speed the output, may adjust the variable delay, such as that shown in FIG. 5 at 520 for optimum performance. For example, with a known data pattern for input Dx and a fixed setup time, by varying the pre-clock and post-clock interval (410 to 310, 310 to 410) it is possible to determine the range of functionality for a register to correctly clock in data. If the register clock is too early or late then correct data will not be latched. Once a range of functionality is determined, the controller may pick a pre or post clock value to use.

In one embodiment of the invention the internal clock may be generated by using a phase locked loop (PLL) in communication with the external clock. In one embodiment of the invention the internal clock may be generated by using a delay locked loop (DLL) in communication with the external clock.

Figure 6:
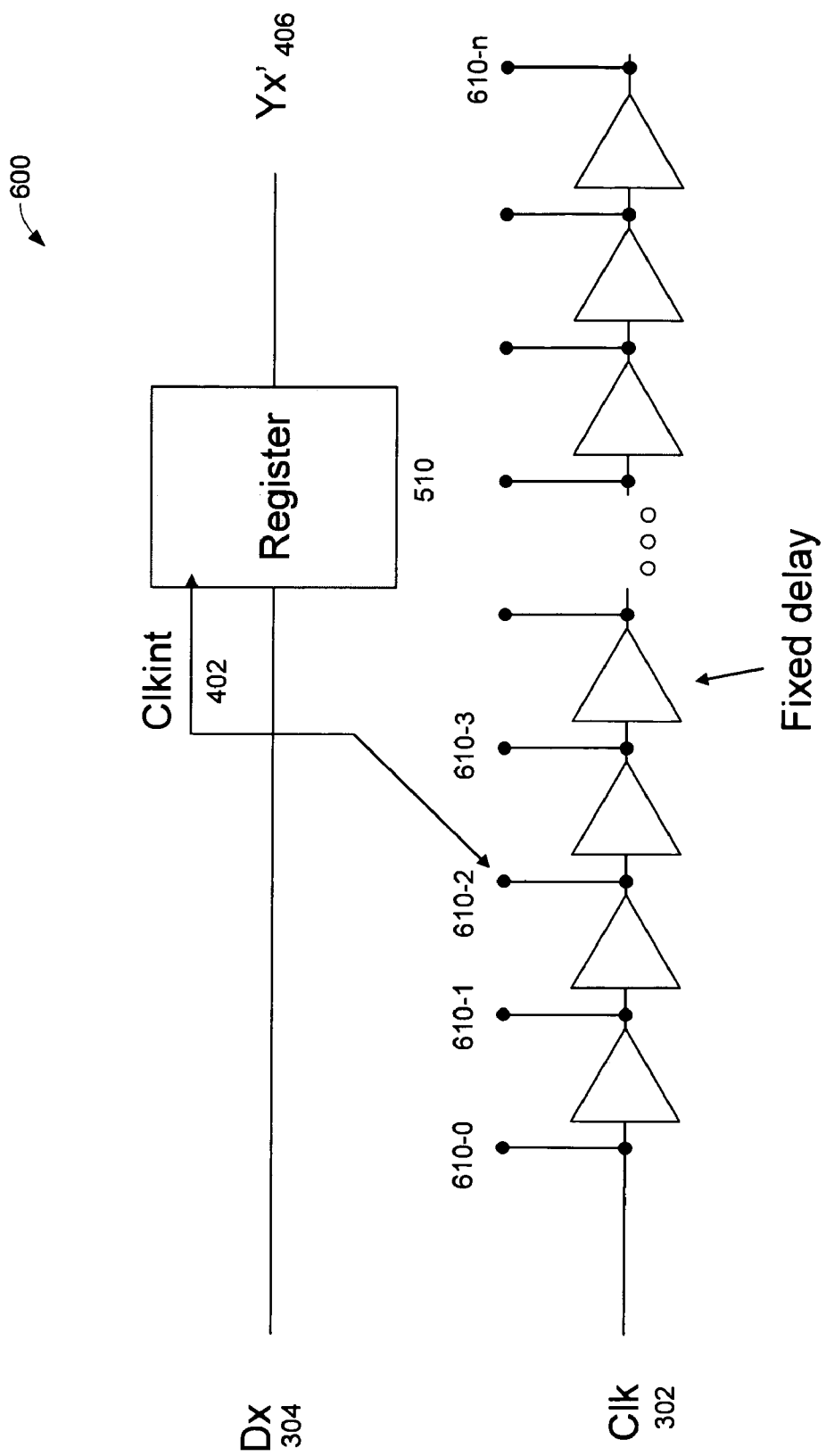
FIG. 6 illustrates one embodiment of the invention where a number of fixed delays provide a series of timing delays.

FIG. 6 illustrates one embodiment of the invention 600, where a number of fixed delay elements provide a series of timing delays 610-0 through 610-n from clock Clk 302. Register 510 has an input Dx 304, a clock input Clkint 402 and has an output Yx' 406. As illustrated in FIG. 6, Clkint 402 may select any delay (610-0 through 610-n) and as shown is connected to a delay at 610-2.

One of skill in the art will appreciate that if the delays cover a full cycle of a clock then any range from no pre or post to pre and post clocking is possible. For example, if the clock is 1 GHz then the clock period is 1 ns. If the fixed delays are 100 ps each and there are 10 delays then a full range of adjustment in 100 ps increments from 0 delay is possible (0 ps—no delay, 100 ps—$1^{st}$ delay, 200 ps—$2^{nd}$ delay, . . . etc.).

In one embodiment of the invention, the delay may be preprogrammed into a part. In one embodiment of the invention, the delay may be dynamically adjustable at startup and/or during operation.

One of skill in the art will appreciate that the delay elements may be achieved in a number of ways. As shown in FIG. 6 they are buffers between the taps 610-0 through 610-n. However, in other embodiments of the invention they may be a wire length, inductors, capacitors, active elements, or a combination of these, etc. For example, the delay element may be a delay circuit, such as, for example, the variable delay shown in FIG. 5 at 520.

Figure 7:
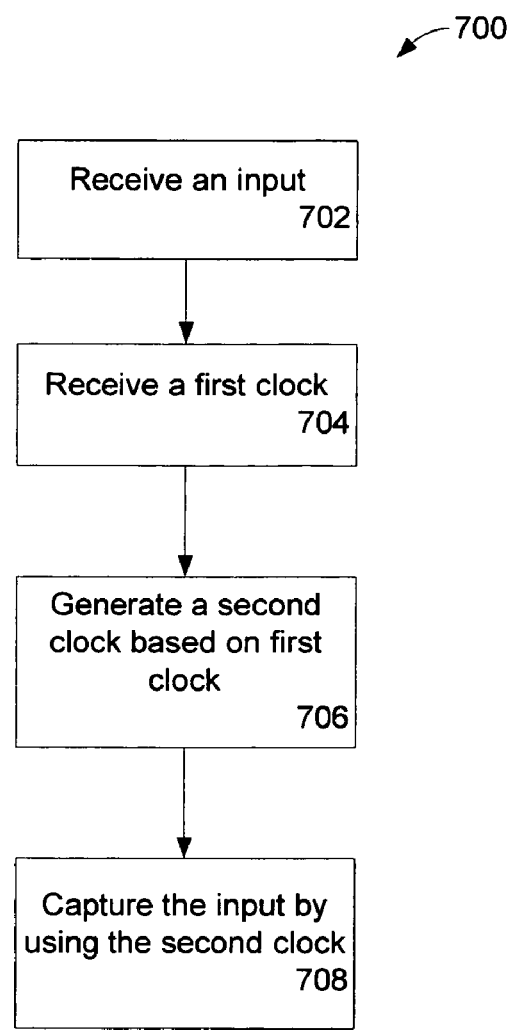
FIG. 7 illustrates one embodiment of the invention in flow chart form.

FIG. 7 illustrates one embodiment of the invention 700, where at 702 an input is received, at 704 a first clock is received, at 706 a second clock is generated based on the first clock, and at 708 the input (from 702) is captured using the second clock (generated at 706).

Figure 8:
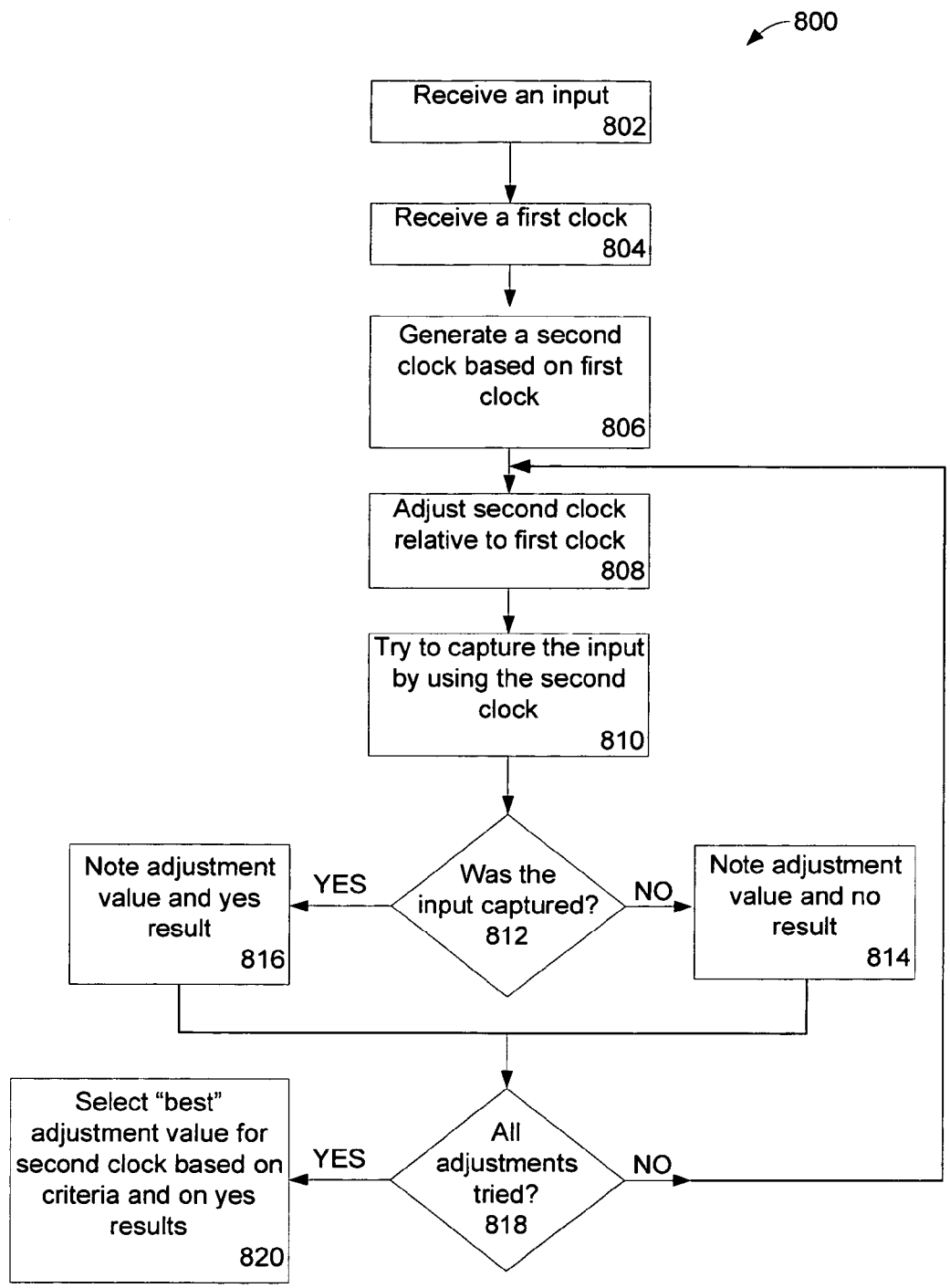
FIG. 8 illustrates a flow chart of one embodiment of the invention.

FIG. 8 illustrates one embodiment of the invention 800 where the second clock is adjusted to a "best" value based on adjustments that worked and criteria, for example, but not limited to, earliest adjustment that captured the input, middle of the range of adjustments that captured the input, the last adjustment that captured the input, the next to earliest adjustment that captured the input, etc.

At 802 an input is received, at 804 a first clock is received, at 806 a second clock is generated based on the first clock. At 808 the second clock is adjusted relative to the first clock, at 810 the second clock (as adjusted at 808) is used to try and capture the input (from 802). At 812 a check is made to see if the input (from 802) was captured. At 814 if the input was not captured the adjustment value and lack of capture is noted. At 816 if the input was captured the adjustment value and capture is noted. At 818 a check is made to see if all adjustments (or a range of adjustments) have been tried, if not then the second clock is adjusted at 808. If all adjustments have been tried then at 820 a "best" adjustment value for the second clock is selected based on criteria and adjustments that captured the input.

In one embodiment of the invention, a way to determine if the input was captured (such as at 812) is to have two registers in parallel with each receiving the same data input during testing, one with a fixed clock delay, and the other with an adjustable clock delay. By "sweeping" the adjustable delay (i.e. trying different delays) and comparing its output with that of the fixed clock delay (i.e. for example not adjusted and "tied" to the external clock, e.g. in FIG. 6, Clk 302 tied into Clkint 402, via 610-0 tap) when transitions occur, it is possible to determine if the input was captured correctly. Other approaches are also possible, such as, working with a known data input stream, etc.

One of skill in the art will appreciate that by proper placement of the "pre-clock" in relation to the original (such as system) clock taking into consideration the setup time an earlier output is possible. Conversely an output may be delayed.

One of skill in the art will also appreciate that setup time for a circuit, such as a register, may be different based on the data input state. For example, the setup time for a register receiving a logic high data input may be different than for a register receiving a logic low data input. Thus, although the invention discussion above has treated them, for the sake of discussion, as being the same, this is not necessary the case and the techniques discussed above may be applied so that the pre-clocking, or post-clocking may be based on the data input. Thus, for example, different pre-clocking times may be used based on the state of the data input.

In a similar fashion, outputs from a device, such as a register used in a system, may be able to slew at different rates based upon the direction of the output transition (from high toward low, low toward high, 3-state toward high or low, etc.) and this may be used to select the pre-clocking, or post-clocking time interval. One of skill in the art will appreciate that the pre-clocking, or post-clocking time interval may be based on other parameters, such as, but not limited to data input state, output slew, temperature, voltage, device characteristics or processing, etc., or a combination of these, etc.

Thus a method and apparatus for pre-clocking have been described.

Figure 1:
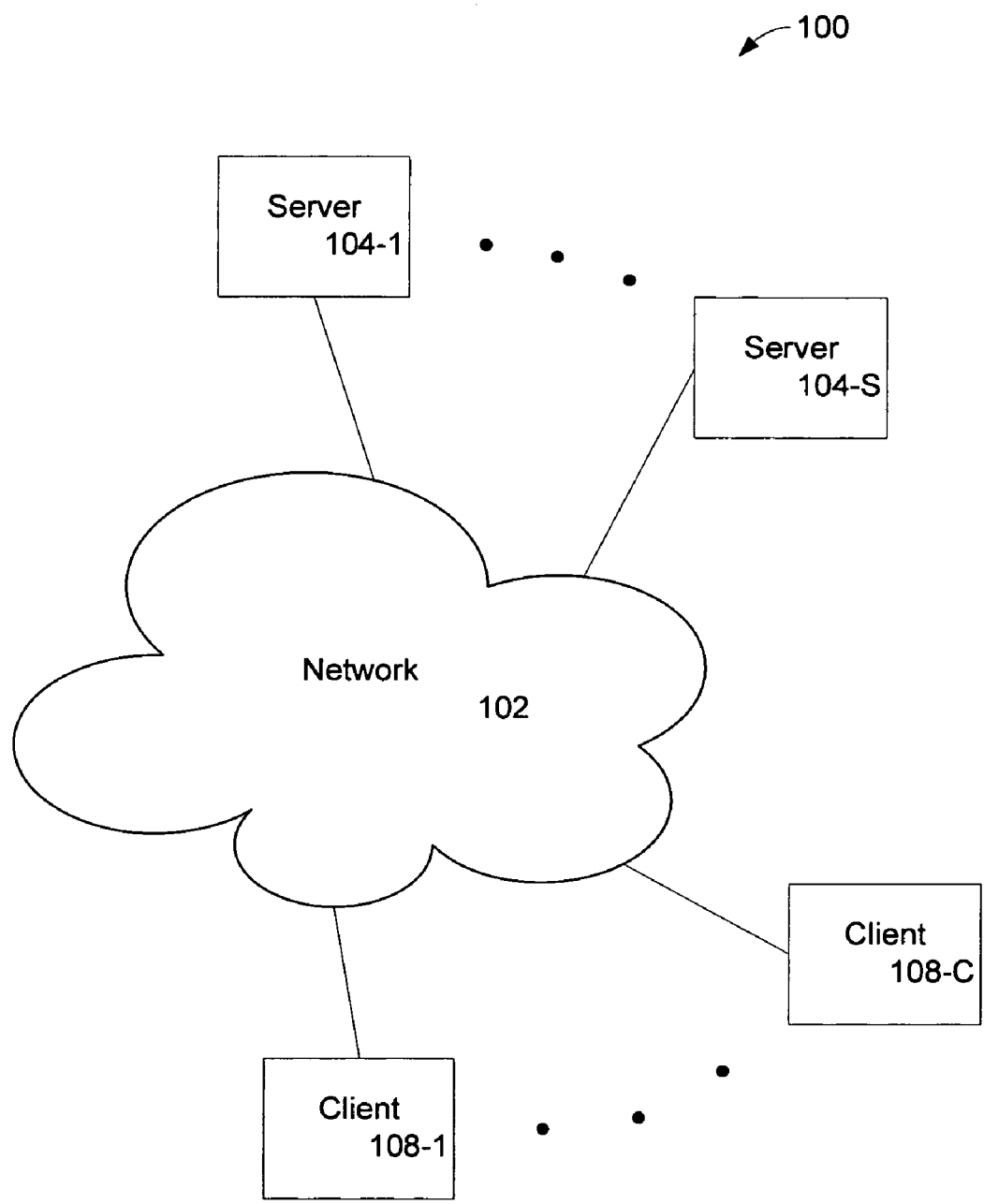
FIG. 1 illustrates a network environment in which the method and apparatus of the invention may be used.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
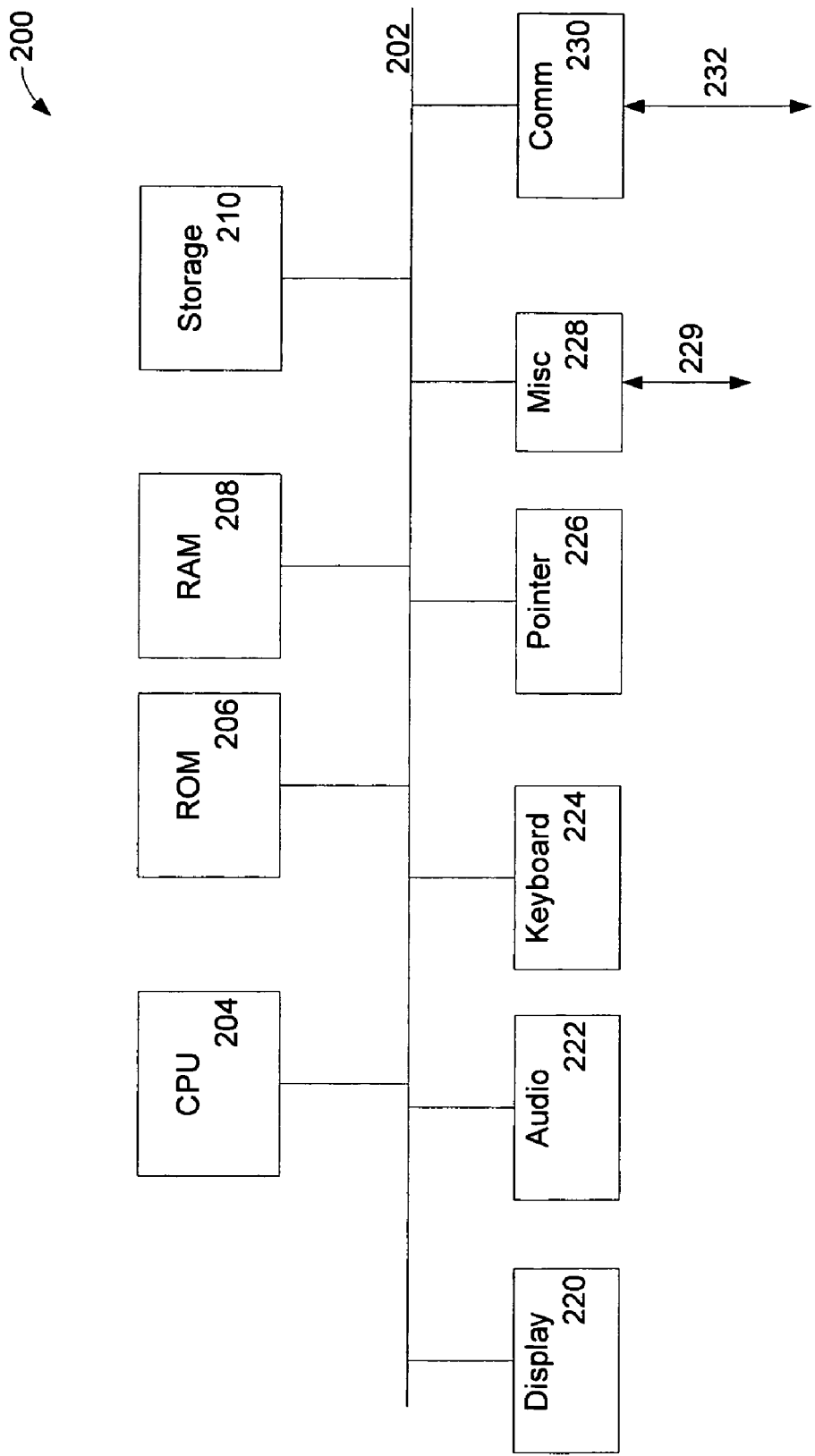
FIG. 2 is a block diagram of a computer system in which some embodiments of the invention may be used.

FIG. 2 is a block diagram of a computer system 200 in which some embodiments of the invention may be used and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of communicating means or device whether local or remote, such as a LAN, a WAN, a system bus, etc. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. The Central Processing Unit (CPU) 204, the Read Only Memory (ROM) 206, the Random Access Memory (RAM) 208, and in fact most of the components and in FIG. 2 may make use of embodiments of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of skill in the art that the present invention may be practiced without these specific details. In some instances, well-known structures and devices are shown in block diagram form, rather than in detail, in order to avoid obscuring the present invention. These embodiments are described in sufficient detail to enable those of skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of skill in the data processing arts to most effectively convey the substance of their work to others of skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities.

Further, any of the methods according to the present invention can be implemented in hard-wired circuitry, by programmable logic, or by any combination of hardware and software.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software.

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

As used in this description, "pre-clocking", "post-clocking" or similar phrases are used, among other things, to describe the relationship between one clock relative to another clock. For sake of discussion and because faster is better, pre-clocking has been described in detail. However, the invention is not so limited and post-clocking is also possible. For example, if a device needs a longer setup time, then post-clocking may be useful. What is to be appreciated is that by adjusting one clock relative to another (for example, an internal clock register clock relative to an external register or system clock) performance of a device (such as register) or a system may be improved or enhanced.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

Thus a method and apparatus for pre-clocking have been described.

What is claimed is:

1. An apparatus comprising:
   means for receiving an input;
   means for receiving a first clock;
   means for generating a second clock based on said first clock;
   means for generating a third clock based on said second clock;
   means for comparing said first clock with said third clock; and
   means for capturing said input by using said second clock.

2. The apparatus of claim 1 wherein:
   said means for generating said second clock further comprises means for delaying said first clock; and
   said means for generating said third clock further comprises means for delaying said second clock.

3. The apparatus of claim 2 wherein said means for delaying said first clock further comprises means for adjusting said delaying.

4. The apparatus of claim 3 wherein said comparing further comprises controlling said means for adjusting said delaying so that said first clock and said third clock are at a substantially fixed phase relationship.

5. The apparatus of claim 4 wherein said substantially fixed phase relationship is substantially zero phase relationship.

* * * * *